United States Patent
Chen et al.

(10) Patent No.: US 7,412,117 B2
(45) Date of Patent: Aug. 12, 2008

(54) APPARATUS AND METHODS FOR DISTRIBUTED TEMPERATURE SENSING

(75) Inventors: Yuehua Chen, Southampton (GB); Arthur H. Hartog, Winchester (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 20 days.

(21) Appl. No.: 10/580,642

(22) PCT Filed: Oct. 18, 2004

(86) PCT No.: PCT/GB2004/004383

§ 371 (c)(1), (2), (4) Date: Mar. 28, 2007

(87) PCT Pub. No.: WO2005/054801

PCT Pub. Date: Jun. 16, 2005

(65) Prior Publication Data

US 2007/0229816 A1  Oct. 4, 2007

(30) Foreign Application Priority Data

Nov. 26, 2003 (GB) .................................. 0327461.0

(51) Int. Cl.
   *G02B 6/00* (2006.01)
   *G01K 11/32* (2006.01)
(52) U.S. Cl. .................................. 385/12; 374/E11.015
(58) Field of Classification Search .................... 385/12, 385/32; 374/E11.001, E11.015; 356/73.1; 250/227.14
See application file for complete search history.

(56) References Cited

U.S. PATENT DOCUMENTS

| 4,685,799 A | * | 8/1987 | Brininstool | 356/73.1 |
| 4,714,829 A | * | 12/1987 | Hartog et al. | 250/227.14 |
| 2004/0202401 A1 | * | 10/2004 | Berg et al. | 385/12 |

* cited by examiner

*Primary Examiner*—Hemang Sanghavi
(74) *Attorney, Agent, or Firm*—Bryan P. Galloway; Daryl R. Wright (57) ABSTRACT

A sensing fibre for use in a distributed temperature sensing system comprises an optical fibre to be deployed in a measurement region in which a temperature measurement is to be made, which incorporates a reflective element, such as a join between portions of fibre, and a coiled fibre portion positioned adjacent a distal side of the reflective element, the coiled fibre portion contributing substantially nothing to the spatial extent of the optical fibre when deployed. In use, the effect of any forward propagating light incident on the reflective element that is returned for detection by the system, and which saturates the detector, can be eliminated by removing the part of the detected signal that corresponds to the coiled portion, after which the detector will have recovered. The remaining parts of the signal can be used to derive the distributed temperature profile since these parts represent the whole extent of the sensing fibre owing to the lack of spatial extent of the coil. Coils can be provided on both sides of the reflective element for double-ended temperature sensing techniques.

26 Claims, 5 Drawing Sheets

APPARATUS AND METHODS FOR DISTRIBUTED TEMPERATURE SENSING

BACKGROUND OF THE INVENTION

1. Field of the Invention

The present invention relates to apparatus for distributed temperature sensing, and methods of using the apparatus to perform distributed temperature sensing.

2. Description of Related Art

Distributed temperature sensing (DTS) is a temperature measurement technique that uses optical fibre as a temperature sensor, and exploits Raman scattering within the fibre to determine temperature. The technique is described in Dakin, J. P. et al.: "Distributed Optical Fibre Raman Temperature Sensor using a semiconductor light source and detector"; Electronics Letters 21, (1985), pp. 569-570, and UK Patent Application GB 2140554A. A sensing fibre is deployed in an environment of interest in which temperature is to be measured. A pulse of probe light, typically a high power pulse from a laser, is launched into the fibre and propagates therein. The light undergoes scattering within the fibre from which several signals result. Rayleigh backscattering gives back-propagating light at the original probe wavelength. Raman scattering produces light at two Raman-shifted wavelengths, the Stokes and anti-Stokes signals, the amplitude of which is temperature-dependent. This scattering is generated in both the forward and backward directions. The backscattered Raman signals are detected as they emerge from the launch end of the fibre. The time between launch and detection is proportional to the distance traveled by the light in the fibre, so that the instantaneous Raman amplitude can be related to the position along the fibre of the originating scattering event. A distributed profile of temperature along the fibre is thus obtained. The anti-Stokes signal is more sensitive to temperature changes than the Stokes component, so the former is generally measured, and further improvement is often achieved by measuring both and calculating the ratio of the anti-Stokes to Stokes signals. Double-ended systems are commonly employed, in which the fibre is deployed in a loop, and measurements made from both ends of the fibre. A double-ended DTS system is described in P. di Vita, U. Rossi, "The backscattering technique: its field of applicability in fibre diagnostics and attenuation measurements"; Optical and Quantum Electronics 11 (1980), pp. 17-22. Comparison of the two measurements can be made to take account of losses in the fibre, which, unlike the temperature effects, appear opposite in sense when viewed from opposite ends of the fibre.

A DTS system typically includes filters designed to reject unwanted back-propagating light at the launch end of the fibre. This primarily relates to blocking light at the probe wavelength, to reject the Rayleigh backscattering and also Fresnel reflections of the probe pulse, while allowing the Raman signals to pass through.

Fresnel reflections may arise in the event that the optical fibre includes one or more optical connectors or couplers used to join sections of fibre together. These devices can have undesirably high reflectivity, and will reflect a portion of any forward propagating light. As mentioned, reflections of the probe pulse can be addressed with suitable filtering.

However, the forward propagating light also includes the forward Raman scattering. This signal contains the same energy as the Raman backscattering, and propagates essentially with the probe pulse. Thus, a pair of forward scattered Raman pulses (the Stokes and anti-Stokes components) builds up, with energy roughly equal to the time-integrated power of the Raman backscattered signals. The peak power of the forward Raman pulses can thus be many times the instantaneous power of the backscattered signals.

These pulses will undergo Fresnel reflection at any coupler or other reflective element along the sensing fibre, so that back-propagating components at the Stokes and anti-Stokes wavelengths are created. These will be detected along with the genuine Stokes and anti-Stokes backscattered signals, and cannot be distinguished therefrom. Thus, the detected backscattered temperature-dependent signal is disrupted at the position of the coupler, giving an inaccurate temperature measurement at that point. Further, the detector or detectors employed are typically highly sensitive to allow detection of the Raman backscattering which is of a much lower power than the original probe pulse. Fresnel reflection of the much higher power forward Raman scattering gives a high power back-propagating component, which can saturate the detectors or subsequent preamplifiers, or possibly subsequent circuitry. The instantaneous backscattered signal is lost, and also a certain amount of the subsequent backscattered signal during the time taken for the detector to recover and resume its usual operation.

The higher the reflectivity of the coupler, the greater the undesirable effects will be. For a single ended system, the effects also depend on the position of the coupler along the fibre. The degree to which the effects are problematic will depend on the accuracy desired of the temperature measurement. For some applications, an accuracy of 0.1 K is required, and Fresnel reflections will typically not allow this level of accuracy to be achieved.

Thus there is a need to address the problem of Fresnel reflections from fibre couplers and other reflective components, so that more accurate DTS temperature measurements can be made.

BRIEF SUMMARY OF THE INVENTION

Accordingly, a first aspect of the present invention is directed to a sensing fibre for use in a distributed temperature sensing system, comprising: an optical fibre for spatially extended deployment within a measurement region, the optical fibre incorporating: a reflective element; and a coiled fibre portion associated with the reflective element and positioned adjacent a distal side of the reflective element, the coiled fibre portion contributing substantially nothing to the spatial extent of the optical fibre when deployed.

The coiled fibre portion, because it has no spatial length in the measurement direction, is effectively redundant as regards obtaining a temperature profile over the extent of the sensing fibre. However, light propagates along it, and it produces Raman backscatter, just as the remainder of the sensing fibre does. This backscatter will be detected at the fibre end, as usual, but if any saturation of the detector in the distributed temperature sensing (DTS) system occurs due to reflections from the immediately preceding reflective element, the backscatter from the coil will arrive at the detector while the detector is recovering its normal operation. Therefore, the disrupted part of the detected signal corresponds to light received from coil, which is not needed for the temperature profile. This part of the signal can hence be discarded with no loss of useful temperature data, allowing the disruption to be removed to leave a desired good quality profile over the length of the sensing fibre.

In some embodiments, the optical fibre is provided with a connector at its proximal end for connecting the optical fibre to a distributed temperature sensing system unit. This allows the sensing fibre to be attached and detached from a DTS system unit as and when required, for example, for ease of transportation, service and repair of the system, exchange with an alternative sensing fibre, or replacement when damaged or faulty.

The sensing fibre may include several reflective elements which may all contribute to disrupting the measurement signal and swamping the detector. This may be addressed by providing a coil of fibre after each reflective element. Therefore, advantageously, the optical fibre further incorporates one or more further reflective elements, and a coiled fibre portion associated with each of the one or more further reflective elements and positioned adjacent a distal side of its associated further reflective element.

Many DTS techniques utilise a double-ended approach, involving obtaining measurements from both ends of a sensing fibre, and comparing the results to remove unwanted effects such as fibre transmission loss. In this case, it is convenient to provide coils of fibre on either side of any reflective element, so that the signal disruption can be removed for either propagation direction. Further, providing coils in pairs allows the fibre to be used from either end even in a single-ended DTS technique, without the requirement to check that the fibre orientation is correct. Therefore, in an advantageous embodiment, the optical fibre further incorporates a further coiled fibre portion associated with the or each reflective element and positioned adjacent a proximal side of its associated reflective element, the further coiled fibre portion contributing substantially nothing to the spatial extent of the optical fibre when deployed. To facilitate double-ended use and non-end-specific single-ended use, the optical fibre is further provided with a connector at its distal end for connecting the optical fibre to a distributed temperature sensing system unit.

To obtain maximum elimination of the disrupted signal, the DTS system detector should preferably have fully recovered its normal operation by the time it begins to receive back-scattered light from the post-coil section of the fibre, so preferably the coil length is selected accordingly. The actual coil length required for this will depend on a number of factors, including the recovery time of the detector of the DTS system, the reflectivity of the reflective portion, the power of the pulses launched into the sensing fibre, and the desired accuracy of the temperature measurements. Therefore, the or each coiled fibre portion may have a length in the range 1 m to 500 m, 1 m to 100 m, or 1 m to 50 m, for example.

To obtain a sensing fibre of a desired length, it may be necessary to join individual portions of optical fibre end-to-end. Joining of fibres may also be necessary if a section of fibre needs to be replaced, or if discrete fibre sensors or other individual devices are built into the sensing fibre. Therefore, there will be cleaved fibre ends along the length of the sensing fibre; these can cause Fresnel reflection of incident light and hence contribute to the problem of disturbance of the measured Raman signal. In some embodiments, therefore, one or more of the or each reflective element comprises a join between two portions of optical fibre.

However, this undesirable reflection from the fibre ends can be reduced by providing angled end facets, so that incident light is reflected away at an angle instead of being returned along the fibre to the detector. Advantageously, therefore, the join may comprise abutted end facets of the two portions of optical fibre, each facet arranged at an angle to a longitudinal axis of the optical fibre to reduce back-reflection of incident light.

Further, for any type of join, the join may conveniently be implemented via an optical fibre connector.

As discussed above, the length of the fibre coil should preferably be selected with reference to the recovery time of the detector after saturation. Advantageously, therefore, in use, the detector becomes saturated by Raman scattered light reflected from the or each reflective element and has a recovery time after saturation, and the or each coiled fibre portion has a length not less than a distance the Raman scattered light can propagate in the sensing fibre during the recovery time.

After generation, the detector output signal may be processed appropriately to obtain the desired temperature profile from the measured signal. The processing may conveniently be performed wholly or partly integrally with the DTS system, or the measurement data may alternatively be stored or transmitted or copied elsewhere for processing remotely and/or at a later time. Therefore, according to various embodiments, the system may further comprise a processor operable to receive the output signal from the detector and to determine a profile of temperature along the spatial extent of the fibre from the output signal, or the system may further comprise a processor operable to receive the output signal from the detector and to remove from the output signal a part or parts corresponding to detected light received from the or each coiled fibre portion, and possibly further operable to determine a profile of temperature along the spatial extent of the fibre from the output signal.

A second aspect of the present invention is directed to a method of distributed temperature sensing comprising: deploying an optical fibre in a measurement region in a spatially extended deployment, the optical fibre incorporating a reflective element and a coiled fibre portion associated with the reflective element and positioned adjacent a distal side of the reflective element, the coiled fibre portion contributing substantially nothing to the spatial extent of the deployed optical fibre; launching a pulse of probe light into a proximal end of the optical fibre; detecting light emitted from the proximal end of the optical fibre arising from Raman scattering of the probe light within the optical fibre, the detected light indicative of temperature along the spatial extent of the optical fibre; generating an output signal representative of the detected light; removing from the output signal a part corresponding to detected light received from the coiled fibre portion; and determining a profile of temperature along the spatial extent of the fibre from the output signal.

In some embodiments, the detecting is performed using a detector that becomes saturated by Raman scattered light reflected from the reflective element and has a recovery time after saturation, and the coiled fibre portion has a length not less than a distance the Raman scattered light can propagate in the optical fibre during the recovery time. The optical fibre may further incorporate one or more further reflective elements and a coiled portion associated with each of the one or more further reflective elements and positioned adjacent a distal side of its associated further reflective element.

If desired, the method can be extended to double-ended distributed temperature sensing, in which case fibre coils are preferably arranged on each side of the reflective elements. Thus, the optical fibre may further incorporate a further coiled fibre portion associated with the or each reflective element and positioned adjacent a proximal side of its associated reflective element, the further coiled fibre portion contributing substantially nothing to the spatial extent of the deployed optical fibre, and the method may further comprise: launching a pulse of probe light into a distal end of the optical fibre; detecting light emitted from the distal end of the optical fibre arising from Raman scattering of the probe light within the optical fibre, the detected light indicative of temperature along the spatial extent of the optical fibre; generating a second output signal representative of the detected light from the distal end of the fibre; removing from the second output signal parts corresponding to detected light received from the coiled fibre portion and the further coiled portion; removing from the said output signal a part corresponding to detected light received from the further coiled portion; and determining a profile of temperature along the spatial extent of the fibre from the output signal and the second output signal.

Other embodiments of this method include deploying a sensing fibre having any or all of the various features outlined above.

A third aspect of the present invention is directed to a sensing fibre for use in a distributed temperature sensing system, comprising: an optical fibre for spatially extended deployment within a measurement region comprised of two optical fibre portions joined by a join comprising abutted end facets of the two optical fibre portions, each facet arranged at an angle to a longitudinal axis of the optical fibre to reduce back-reflection of incident light.

The use of angled fibre end facets in joins between portions of optical fibre can reduce undesirable reflection to an acceptable level, for example having regard to a desired degree of accuracy of the temperature measurements obtained with the sensing fibre, or even eliminate reflection entirely. Thus, a sensing fibre according to the fourth aspect can be used to improve the quality of distributed temperature measurements.

The optical fibre may be further comprised of one or more further optical fibre portions sequentially joined to the said two optical fibre portions by one or more joins comprising abutted end facets of adjacent optical fibre portions, each facet arranged at an angle to a longitudinal axis of the optical fibre to reduce back-reflection of incident light. Multiple fibre portions may be used to achieve a required length of fibre or to incorporate additional components, for example. The or each join may be implemented via an optical fibre connector.

Further, the optical fibre may be provided with a connector at its proximal end for connecting the optical fibre to a distributed temperature sensing system unit, and/or a connector at its distal end for connecting the optical fibre to a distributed temperature sensing system unit.

A fourth aspect of the present invention is directed to a distributed temperature sensing system comprising: a sensing fibre according to embodiments of the fourth aspect; an optical source operable to launch pulses of probe light into a proximal end of the sensing fibre; and a detector operable to detect light emitted from the proximal end of the sensing fibre arising from Raman scattering of the probe light within the sensing fibre, the detected light indicative of temperature along the spatial extent of the sensing fibre, and to generate an output signal representative of the detected light. The system may further comprise a processor operable to receive the output signal from the detector and to determine a profile of temperature along the spatial extent of the fibre from the output signal.

A fifth aspect of the present invention is directed to a method of distributed temperature sensing comprising: deploying an optical fibre in a measurement region in a spatially extended deployment, the optical fibre comprised of two optical fibre portions joined by a join comprising abutted end facets of the two optical fibre portions, each facet arranged at an angle to a longitudinal axis of the optical fibre to reduce back-reflection of incident light; launching a pulse of probe light into a proximal end of the optical fibre; detecting light emitted from the proximal end of the optical fibre arising from Raman scattering of the probe light within the optical fibre, the detected light indicative of temperature along the spatial extent of the optical fibre; generating an output signal representative of the detected light; and determining a profile of temperature along the spatial extent of the fibre from the output signal.

The optical fibre may be further comprised of one or more further optical fibre portions sequentially joined to the said two optical fibre portions by one or more joins comprising abutted end facets of adjacent optical fibre portions, each facet arranged at an angle to a longitudinal axis of the optical fibre to reduce back-reflection of incident light. The or each join may be implemented via an optical fibre connector.

For double-ended distributed temperature sensing, the method may further comprise: launching a pulse of probe light into a distal end of the optical fibre; detecting light emitted from the distal end of the optical fibre arising from Raman scattering of the probe light within the optical fibre, the detected light indicative of temperature along the spatial extent of the optical fibre; generating a second output signal representative of the detected light from the distal end of the fibre; and determining a profile of temperature along the spatial extent of the fibre from the output signal and the second output signal.

BRIEF DESCRIPTION OF THE DRAWINGS

For a better understanding of the invention and to show how the same may be carried into effect reference is now made by way of example to the accompanying drawings in which.

DETAILED DESCRIPTION OF THE INVENTION

Distributed Temperature Sensing Systems

Figure 1:
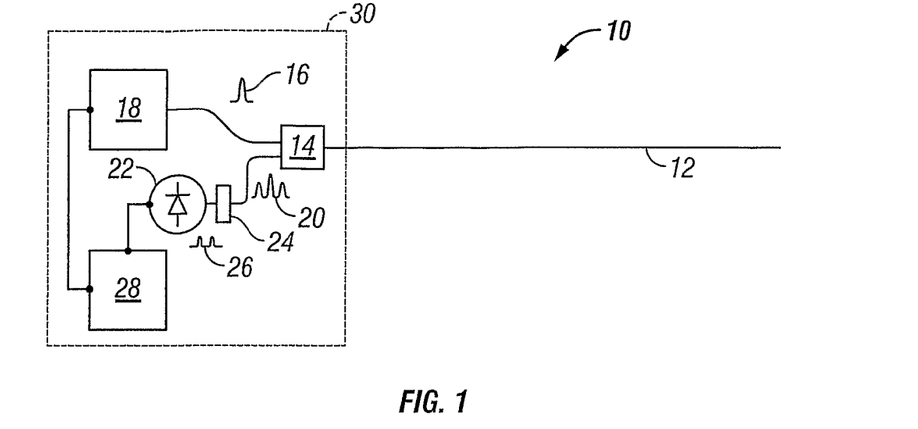
FIG. 1 shows a schematic representation of an example single-ended DTS system in which embodiments of the present invention can be implemented.

FIG. 1 shows a schematic representation of an example of a distributed temperature sensing (DTS) system or apparatus. The system 10 comprises a sensing fibre 12, comprising a length of optical fibre, for spatially extended deployment into a measurement region or environment. In other words, when deployed, the sensing fibre is arranged to extend through the measurement region following a line along which it is desired to measure a temperature profile. The fibre may be single mode or multimode, although multimode is generally preferred for DTS techniques. A proximal end of the fibre 12 is connected to an optical coupler 14, such as a wavelength division multiplexer, a fused fibre coupler, or a fast optical switch. The coupler 14 allows pulses of probe light 16, generated by an optical source 18 such as a laser, to be launched into the fibre 12. Once launched, a pulse propagates along the length of the fibre 12, undergoing Raman scattering at all points. The amplitude of the Raman scattered light is proportional to the local temperature at the point of scattering, so a time/distance resolved measurement of the amount of Raman scattering is indicative of the temperature along the fibre. Backscattered parts of the Raman scattered light, together with Rayleigh backscattered light at the probe pulse wavelength, travel back along the fibre 12 to the proximal end, where the coupler 14 directs the returned light 20 away from the optical source 18 and onto a photodetector 22. One or more filters 24 are positioned in front of the photodetector 22 to remove light at the probe wavelength, and leave only light at the Raman backscatter wavelengths 26 (preferably both the anti-Stokes and the Stokes components, although just one component may be used) for detection. (In general, where both the anti-Stokes and Stokes components are measured, either a movable filter is required to sequentially measure the components, or the light must be split into two channels, each provided with its own detector and preamplifier). The photodetector 22 generates a signal (or signals) in response to the detected light. The detected signal is fed to a processor 28, where signal processing is performed to determine a temperature profile along the fibre, with the aim of providing a desired distributed temperature measurement. The processing may include calculation of distance along the fibre 12 from time information in the detected signal, calculation of the anti-Stokes:Stokes ratio for improved accuracy, and/or calculations to take account of losses in the fibre 12. The processor 28 may perform all processing necessary to return the measurement in a desired format, or may perform none or only part of the processing, and transmit and/or store signal data for processing by a remote processor or similar. Further, the processor 28 may be linked to the optical source 18 for the transmission of control signals to the optical source 18 to control emission of the probe pulses. The processor 28 may be implemented as electronic hardware, computer software, or a combination of the two.

With the exception of the optical fibre 12, some or all of the components of the DTS system may be housed together in a single DTS unit 30, for convenience. The unit 30 may include a connector by which the fibre 12 is connected to the unit, to allow alternative fibres to be used with the same unit, and/or to allow straightforward replacement of the fibre 12.

The system of FIG. 1 is a single-ended DTS system, in which a proximal end of the fibre 12 is located at the DTS unit and a distal end of the fibre is positioned remotely in the measurement region. An alternative is a double-ended DTS system. In such a system, the fibre is deployed in a loop so that both the proximal and distal ends are located at the DTS unit. The unit is configured such that probe pulses can be launched into and received from the proximal end of the fibre, as described above for the single-ended system, and also can be launched into and received from the distal end of the fibre, so that measurements can be made from both ends of the fibre. Comparison of these measurements can allow various fibre losses to be accounted for, since losses generally have different effects when viewed from each fibre end, whereas the temperature information is the same.

Figure 2:
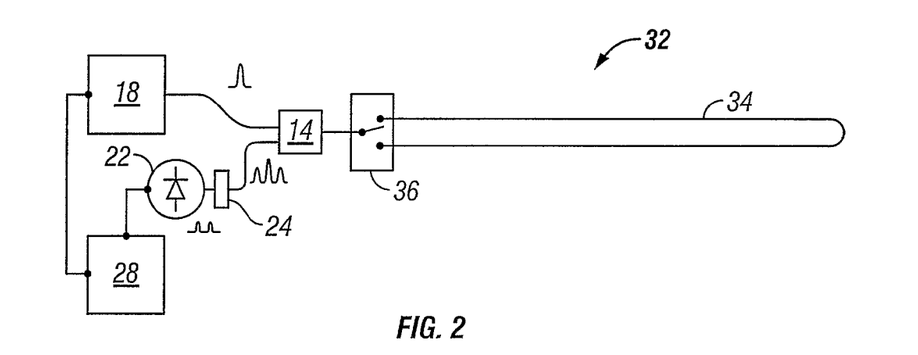
FIG. 2 shows a schematic representation of an example double-ended DTS system in which embodiments of the present invention can be implemented.

A double-ended system may be implemented by providing separate optical sources and detectors for each fibre end, with suitable coupling. However, a simpler arrangement is to provide a single set of components, as in a single-ended system, and a switch arranged to couple the components to one or the other end of the fibre as desired. FIG. 2 shows double-ended apparatus 32 of this kind, in which a fibre 34 is arranged in a loop with its two ends connected to a switch 36 that can couple either of the ends to an optical source 18, or a detector 22.

In either type of system, it may be necessary to provide one or more joins or connections in the sensing fibre, for example, to provide a sufficient length of fibre or to add in components such as discrete sensors. This may be accomplished using optical connectors or fibre couplers. In any event, the fibre ends at a join will cause Fresnel reflection of any forward propagating light. The reflected light propagates back along the fibre to the proximal end, where it is directed to the photodetector. Light at wavelengths other than the Raman, Stokes, and anti-Stokes wavelengths, such as reflection of the probe pulse itself, can be readily eliminated using appropriate filters. However, Fresnel reflection of forward scattered Raman light has the same wavelengths as the backscattered Raman light so cannot be filtered out. The forward Raman light accumulates as a pulse and has a much higher power than the backscattered Raman signal, so that when it is reflected, a substantial amount of light can be returned to the detector, where it is liable to obliterate the temperature information of the backscatter returning from the position of the join and also to saturate the detector so that a subsequent portion of backscatter cannot be detected properly. Temperature measurements from a potentially significant section of the fibre can thereby be lost.

Forward Raman Scattering

Experiments have been performed to show the effect of Fresnel reflection of forward Raman scattering on DTS measurements.

Figure 3A:
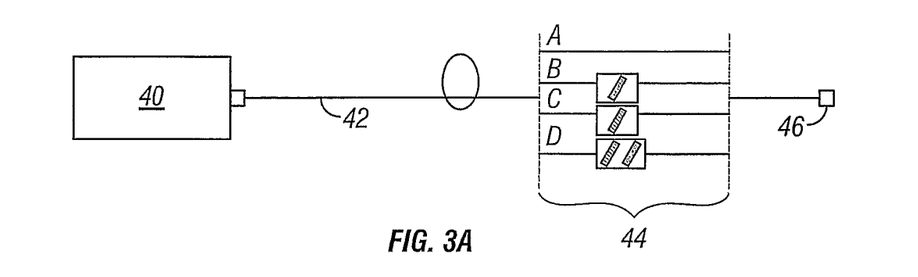
FIG. 3A shows a schematic representation of DTS apparatus used to make experimental measurements showing a need for the present invention.

FIG. 3A shows a schematic representation of apparatus used to perform the experiments. A DTS system unit 40 includes a pulsed high power laser operable to generate probe pulses at 1064 nm. This probe wavelength produces an anti-Stokes signal at 1015 nm. The probe pulses are launched into a sensing fibre 42, which is about 2.3 km in length. In addition, four filter configurations 44 were tested, arranged at the distal end of the fibre, as follows:

A: no filters
B: band pass filter at 1015 nm
C: band pass filter at 1064 nm
D: band pass filter at 1015 nm and band pass filter at 1064 nm.

The 1015 nm, anti-Stokes filter (B) was used with an additional 20 m of fibre, to provide a time delay to separate the pulses for ease of comparison. The fibre arrangements are terminated with a −14 dB reflector 46 at the distal end of the fibre 42, to provide a Fresnel reflection.

Figure 3B:
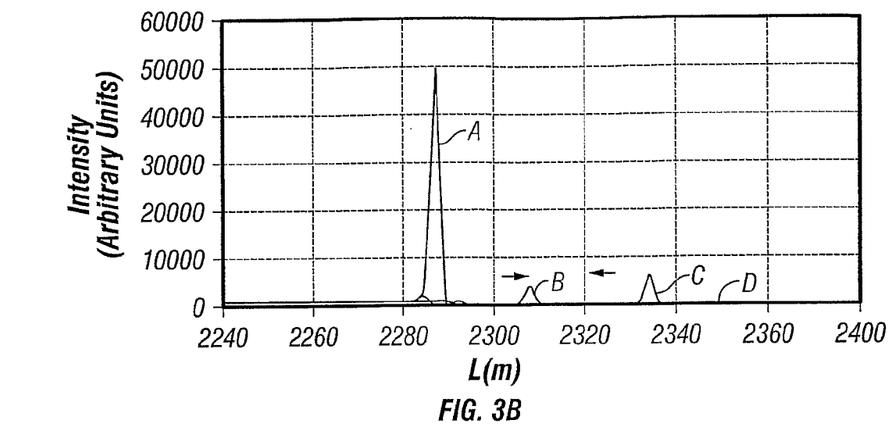
FIGS. 3B, 3C, and 3D show graphs of experimental measurements of Fresnel reflected Raman scattered light obtained using the apparatus of FIG. 3A.

Light returned at the anti-Stokes wavelength was detected for each filter configuration. The results are shown in FIG. 3B, as plots A, B, C, and D of the amplitude of the detected light as a function of length L along the fibre 42. The directions of light propagation are indicated by the arrows. From this it can be seen that the forward Raman scattering occurs at all points along the fibre. When this scattered light meets the reflector it is reflected back to give forward scattered Raman signals in the backwards direction. Also, Fresnel reflection of the forward propagating pump pulse further contributes to the returning light at the anti-Stokes wavelength, since this portion of the probe pulse will undergo Raman scattering as it propagates back to the launch end of the fibre, some of which will be forward scattering in the direction of the launch end. Generally speaking, the contributions to the final detected light from these two sources are similar.

Figure 3C:
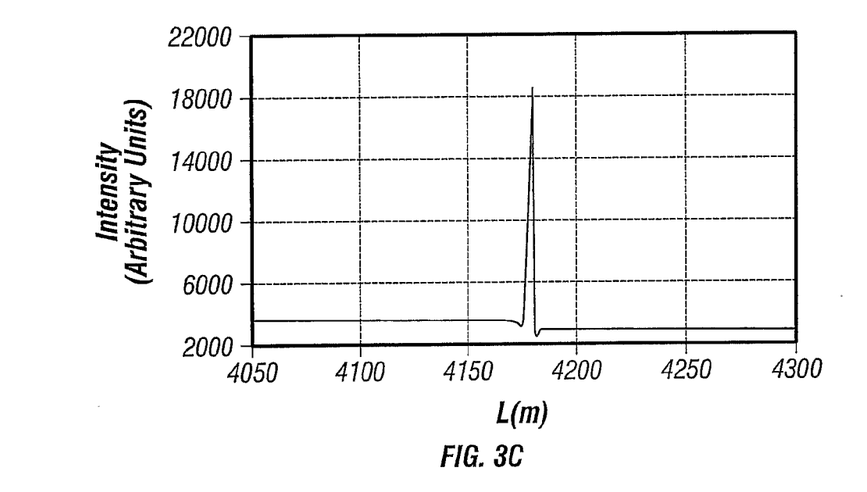

Further experiments used a sensing fibre comprising two sections of about 2 km each of optical fibre joined with a fibre connector having a −27 dB reflectivity. FIG. 3C shows a graph of the measured amplitude of the anti-Stokes signal returned from part of the sensing fibre around the join. A large spike can be seen at the location of the connector, caused by the back-reflected forward Raman scattering. The background level of the graph shows the genuine Raman backscattering.

Figure 3D:
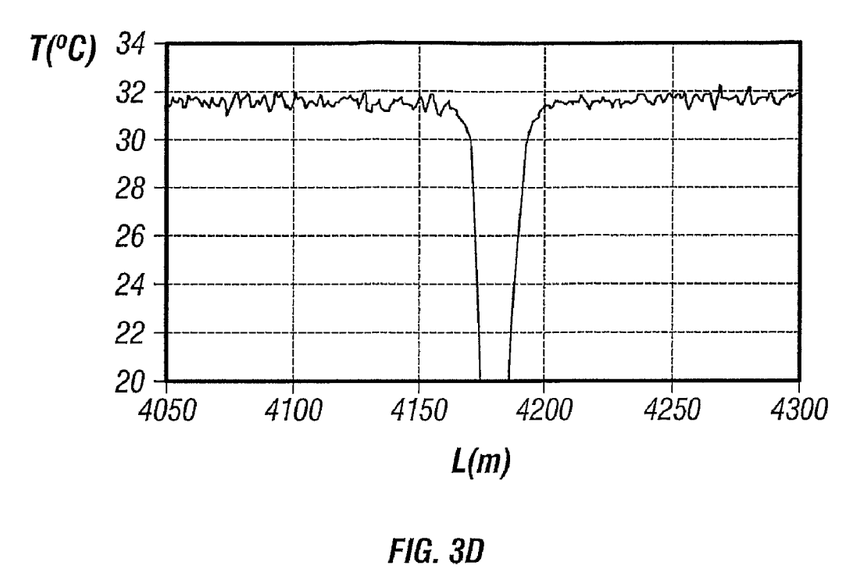

In practice, temperature measurements are commonly obtained from a ratio of the anti-Stokes and Stokes signals. Therefore, both wavelengths are measured, and the ratio determined. This is proportional to the temperature, so that the temperature profile over the fibre length can be calculated from the ratio. FIG. 3D shows the results of this calculation for the anti-Stokes measurement of FIG. 3C. From this it can be seen that the temperature profile is disturbed in the vicinity of the connector, even though in this case the optical pulse duration corresponds to less than 2 m. The disturbance is not confined to the precise position of the connector. It extends beyond the connector location, because the Fresnel reflected light saturates the sensitive photodetector so that Raman light backscattered from points just beyond the connector, and which will therefore arrive at the photodetector just after the Fresnel reflection, is not detected. The size and duration of the disturbance will depend on the level of reflectivity of the join, and the specification of the photodetector. For a single-ended system, the effect is worse for a join far from the DTS unit. Backscattered light returning from remote parts of the fibre is weakened by fibre transmission losses, so that the photodetector much reach a high level of recovery before detection of the backscatter is resumed. In other words, the recovery time is increased, so that a longer length of the fibre is affected. Affected lengths may be from a few metres to a few hundreds of metres, depending on the DTS system.

First Embodiment

To address the problem of temperature measurements disrupted by Fresnel reflections, the present invention arranges a portion of coiled fibre in the sensing fibre immediately after the join, or other reflecting element, i.e. on the distal side of the reflecting element with respect to the forward probe pulse propagation direction. The length of the coiled portion is determined such that the time taken for light to propagate along it preferably matches or exceeds the length of time taken for the photodetector to recover from being overloaded by Fresnel reflections from the reflecting element. This will depend on the reflectivity of the element, which determines the amplitude of the Fresnel reflection, and on the recovery time of the photodetector after receiving a saturating signal of that amplitude.

Figure 4A:
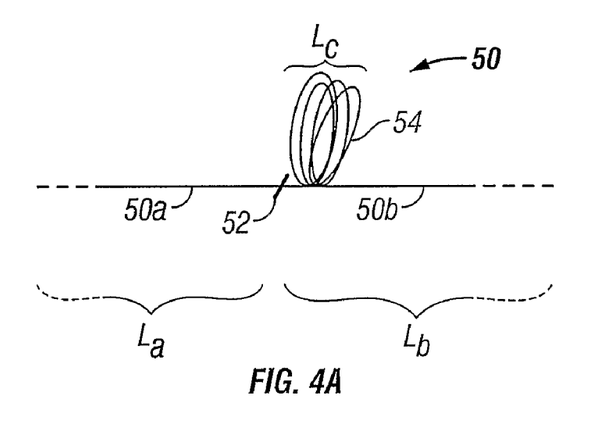
FIG. 4A shows a schematic representation of a first embodiment of a DTS sensing fibre according to the present invention.

FIG. 4A shows a portion of a sensing fibre according to this embodiment. The sensing fibre 50 comprises a proximal portion 50a having a length $L_a$ and a distal portion 50b having a length $L_b$, joined by a connector or coupler 52, having some reflectivity such that it will produce substantially retroreflected Fresnel reflection of incident light, thus sending the light back along the fibre. The distal portion 50b of the fibre 50 incorporates a coiled fibre portion 54, positioned adjacent the distal side of the connector 52 and having a total uncoiled length L.

In operation, therefore, once a probe pulse is launched into the proximal end of the deployed sensing fibre, the photodetector will initially receive and detect Raman backscattering from the portion of the sensing fibre on the proximal side of the join, and will be able to function properly to detect this light. Then, Fresnel reflection of the Raman forward scattering will reach the photodetector, and obliterate the genuine backscattering. Also, the photodetector will likely saturate, and will hence be for a period unable to detect further Raman backscattering, which is now returning from the part of the fibre immediately following the join. This part is the fibre coil. Then, the photodetector recovers its usual operation, and can detect the backscattering again. By this time, the backscattered light is originating from the later part of the coil or from the start of the following, distal, portion of the sensing fibre (depending on whether the coil length exceeds or matches the photodetector recovery time).

Figure 4B:
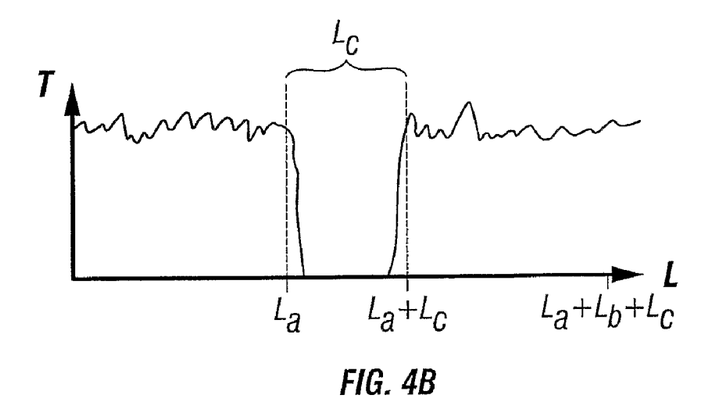
FIGS. 4B and 4C show example graphs of temperature measurements obtained using the sensing fibre of FIG. 4A.
Figure 4C:
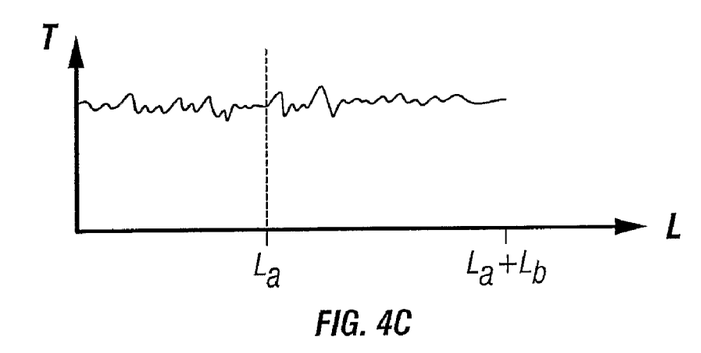

Thus, the total measured backscattered signal will, as expected, have a disturbed part in the vicinity of the join, corresponding to the coil of fibre. FIG. 4B shows a plot of a resulting measurement, showing good temperature measurement over the first portion of the fibre, $L_a$, disrupted measurement over the coil, for distance $L_c$, and good measurement over the remaining part, $L_b$. The coil, however, has a known length and known position along the sensing fibre. Hence, that part of the detected signal which originates from the coil, i.e. that corresponds to detected light received from the coil, can be removed from the overall measurement, thus removing the disrupted part of the signal. Because this discounted part of the fibre is arranged as a coil, it has substantially no spatial extent along the deployed optical fibre, which defines the measurement profile. Instead, the actual deployed extent of the sensing fibre is defined by $L_a+L_b$. Therefore, removal of that part of the measured signal corresponding to the coil does not result in the loss of any part of the distributed measurement. Instead, the two parts of the signal obtained from either side of the coil can be joined together to give the desired temperature profile distributed over the length of the sensing fibre, where length corresponds to the spatial extent of the sensing fibre in the measurement region $L_a+L_b$ (as opposed to actual fibre length $L_a+L_b+L_c$, which includes the length of the coil). FIG. 4C shows the plot of FIG. 4B corrected in this way.

Removal of the relevant part of the measured detected Raman backscatter can be readily implemented by any processor used to handle the measurement data, for example by providing software that can identify and discard the distributed data based on information relating to the length and position of the coil. The removal can be performed at any convenient point during processing of the measurement data. For example, the part of the signal received from the coil can be removed from the raw measurement data, perhaps immediately upon receipt of the measurement signal by the processor. This is advantageous in that unwanted data need not be stored, nor calculations performed upon unwanted data. Alternatively, the removal can be performed at any later point, for example, after final calculation of the temperature profile. These various functions may be performed by any processor included in the DTS system used to perform the measurement, or by one or more alternative processors to which the measurement data is transferred.

Further, the length of the coil may be determined having regard to the desired level of accuracy of the temperature measurements. Lower accuracy requirements may mean that the photodetector does not need to fully recover its usual operation before it can make useful measurements.

As an example, the connector having −27 dB reflectivity whose temperature profile is shown in FIG. 3D requires a coil length of greater than 50 m. However, a wide range of lengths might be suitable, depending on the characteristics of the DTS system as a whole. The coiled fibre portion may have a length in the range 1 m to 50 m, 1 m to 100 m, or 1 m to 500 m, for instance.

Further Embodiments

The first embodiment described above utilises a single coil of fibre on one side of the join in the sensing fibre. This is appropriate for a single ended DTS system, because the coil will always be on the distal side of the join. However, in a double-ended DTS system, the first embodiment will perform as required in one direction only. Therefore, according to a second embodiment, a second coil is provided adjacent the other side of the join. In this way, there is always a coil available for accommodating the recovery time of the photo-detector, no matter which end of the fibre is used as the launch end. Measurement data obtained from the other coil, located before the join with respect to the probe pulse propagation direction, can be removed from the overall measurement in the same way as for the first coil, since its length and position will be known. This coil occupies no spatial extent in the measurement region, so that data obtained from it are redundant as regards the desired temperature profile, and should be disposed of. Thus, for double-ended operation with such a fibre, a measurement is made from each end of the sensing fibre, and for each resulting output signal from the detector, the two parts corresponding to the two coils are removed.

Figure 5A:
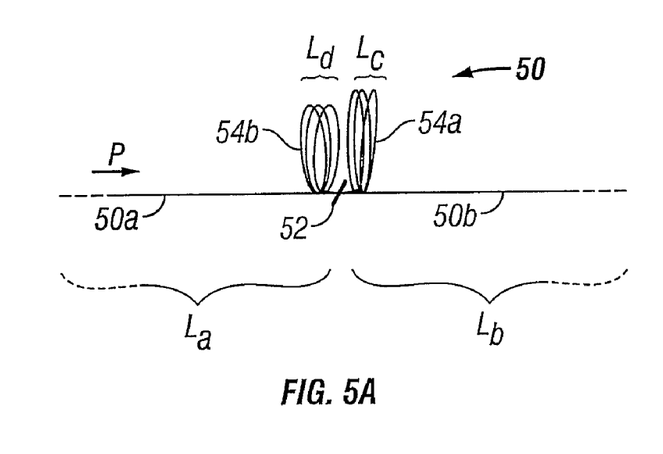
FIG. 5A shows a schematic representation of a second embodiment of a DTS sensing fibre according to the present invention.

FIG. 5A shows a portion of a sensing fibre according to the second embodiment, and suitable for use with a double-ended DTS system (although it can be used in a single-ended arrangement if both coils are accounted for when processing the measurements). The sensing fibre 50 comprises, as before, a proximal portion 50a of length $L_a$ and a distal portion 50b of length $L_b$, joined by a connector 52. A first fibre coil 54a of uncoiled length $L_c$ is positioned adjacent the distal side of the join, in the distal portion 50b of the fibre, and a second fibre coil 54b of uncoiled length $L_d$ is positioned adjacent the proximal side of the join, in the proximal portion 50a of the fibre.

Figure 5B:
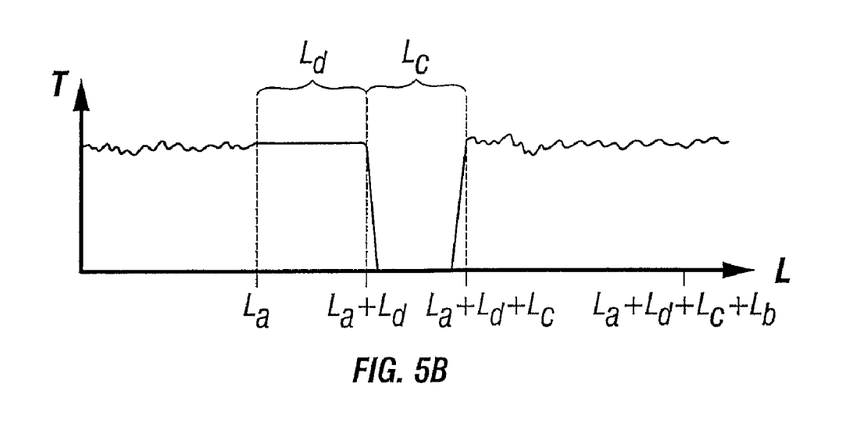
FIG. 5B shows an example graph of a temperature measurement obtained using the sensing fibre of FIG. 5A.

FIG. 5B shows an example graph of a temperature measurement obtained from the sensing fibre of FIG. 5A, for a probe pulse propagating from left to right as indicated by the arrow P. Normal temperature measurements appear in the first part of length La, corresponding to the proximal fibre portion 50a. This is followed firstly by a substantially flat section for the length of the second coil 54b, $L_d$, and secondly by a disrupted portion over the extent $L_c$ of the first coil 54a. Finally, normal measurements resume for the final, distal fibre portion 50b. The second coil gives a substantially flat result because it occupies substantially a single position along the length of the fibre, so is all at the same temperature. Subsequent processing removes the two parts of the measurement corresponding to the two coils, and brings the proximal and distal fibre portions together, to arrive at a profile similar to that of FIG. 4C.

Figure 6A:
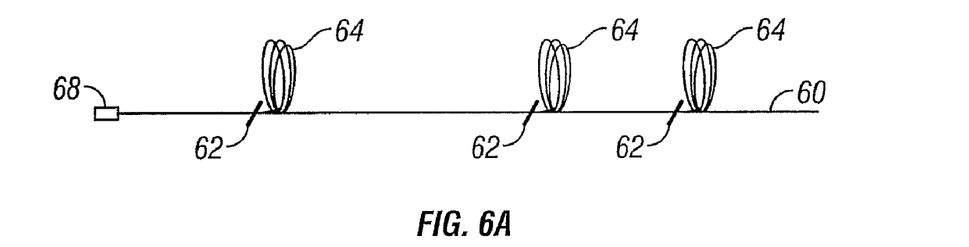
FIGS. 6A and 6B show schematic representations of DTS sensing fibres according to further embodiments of the present invention.
Figure 6B:
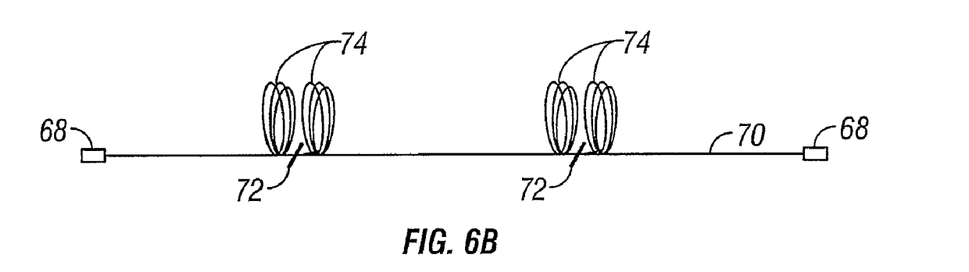

Also, the invention is not limited to a single join or connection in the sensing fibre. A sensing fibre may include more than one join, particularly if it is very long. In this case, a coil or pair of coils can be provided for each join, depending on whether the sensing fibre is for a single-ended or doubled-ended DTS system. FIG. 6A shows a schematic representation of an example of a single-ended sensing fibre 60 having three joins 62 and three associated coils 64, and FIG. 6B shows a schematic representation of an example of a double-ended sensing fibre 70 having two joins 72 and two pairs of associated coils 74. In either case, more joins are also contemplated. For improved convenience, the sensing fibre can be provided with a connector on one or both ends, for connecting the fibre to a unit of a DTS system. The unit can be self-contained, with the sensing fibre being a separate entity that can be attached or removed as required. For double-ended use, connectors should be provided at both the proximal and distal ends of the sensing fibre (see FIG. 6B, showing connectors 68 at each end). Such a fibre can also be used for single-ended use, with either end being designated as the proximal end for connection to a DTS unit. For a dedicated single-ended fibre, with one coil per join, a single connector at the proximal end is adequate, however (see FIG. 6A).

Further refinement may be introduced by reducing the Fresnel reflections per se. One way of doing this is to implement a fibre join using angled, polished end facets of the joined portions. According to this embodiment, the two abutting end facets of the joined fibres are polished or otherwise fashioned to an acute angle with respect to the longitudinal axis of the fibre. Incident light reflected by such an angled surface will be directed away from the propagation axis of the optical fibre, and hence is not back-reflected to the photodetector. This is in contrast with a conventional flat, perpendicular polished fibre end, which will retro-reflect the incident light back upon itself, direct to the photodetector. Thus, angle polishing will reduce or possible completely eliminate back-propagation of Fresnel reflection of the forward-scattered Raman scattering. Angle polishing can reduce the reflectivity of a fibre join down to −60 dB or less.

Figure 7:
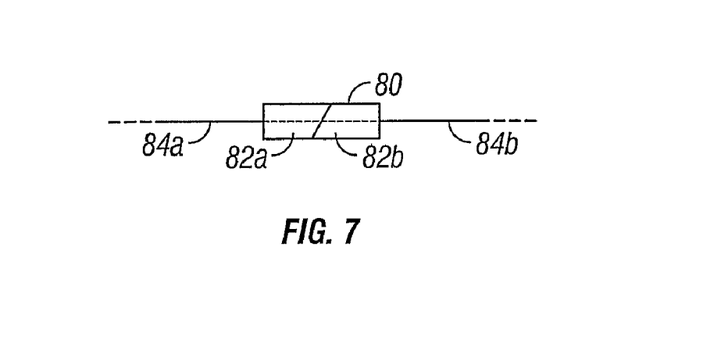
FIG. 7 shows a schematic representation of a DTS sensing fibre according to a yet further embodiment of the present invention.

Whether or not the end facets of the fibre are angle polished to reduce back-reflection, fibre joins can be usefully achieved via an optical fibre connector. FIG. 7 is a schematic representation of an angled, polished optical connector 80, showing how the abutting ends 82 of two portions of fibre 84 are polished to define an angle with respect to the longitudinal axis, represented by the dotted line. Optical connectors can also be used for joining flat, perpendicular fibre ends, however. Further, joins may be achieved in other ways, such as by fusing or bonding the fibre ends to one another.

Thus, according to various embodiments, a join in a sensing fibre can be made with angled, polished fibre ends, perhaps implemented using a connector, and fibre coils can be arranged on one or both sides of the connector, for single-ended or double-ended sensing respectively.

Further, the use of fast-recovery photodetectors and preamplifiers may be considered.

The photodetector, whose function is to convert incident light into a representative electrical signal, may be designed such that it recovers more quickly from the saturation caused by the intense signals reflected from a fibre join and hence provides a more faithful reproduction of the subsequent optical signal. However, the design of a photodetector is an exercise in engineering compromise, and in reducing the recovery time, the noise performance is inevitably degraded. This reduces the accuracy of the temperature profile over the whole length of the fibre, not just in the vicinity of the join. Thus, the embodiments described above are considered to be preferable techniques with regard to overall system performance, since any reduction in performance resulting from adding fibre coils on one or both sides of a join due to increased propagation loss and subsequent reduction in strength of the optical signals will generally be far lower than the degradation in noise of the photodetector if it is speeded up sufficiently to eliminate the need for the fibre coils. However, in some cases, use of a faster photodetector in conjunction with fibre coils might be preferred, in the case that inconveniently long fibre coils are otherwise required, for example.

Although embodiments of the invention have been discussed with regard to the example of joins between portions of optical fibre, typically implemented with optical fibre connectors or couplers, the invention is more widely applicable, since it may be applied to any reflective element within the sensing fibre that produces undesirable back-reflection of forward propagating Raman scattered light. Any such reflective element will produce potential saturation of the photodetector and disruption of the measured signal, with consequential reduced accuracy of the measured temperature profile. This may be addressed using the embodiments of the present invention, regardless of the nature of the element producing the reflection.

Distributed temperature sensors are widely used to obtain temperature profiles. Improved accuracy, as offered by the present invention, is naturally of benefit in most areas. One particular application is in the field of monitoring temperature profiles within oil wells, where measurements of very small changes in temperature are commonly used to deduce fluid flow rate in various sections of a well. Knowledge of the rate of fluid flow is of great importance in oil production, since the rate and volume of production can be predicted, and any problems that cause a change in flow, such as blocking of the wellbore by scale formation, can be identified. High temperature measurement accuracy is desirable to allow flow rate and other parameters to be determined as accurately as possible, so the present invention will be advantageous for the oil industry, among other applications.

What is claimed is:

1. A sensing fibre for use in a distributed temperature sensing system, the distributed temperature sensing system including an optical source for launching light into an end of the sensing fibre, the sensing fibre comprising:
   an optical fibre for spatially extended deployment within a measurement region, the optical fibre incorporating:
   a reflective element; and
   a coiled fibre portion associated with the reflective element and positioned adjacent the reflective element on the side distal from the optical source, the coiled fibre portion contributing substantially nothing to the spatial extent of the optical fibre when deployed.

2. A sensing fibre according to claim 1, in which the optical fibre is provided with a connector at its end on the side of the reflective element opposite the coiled fibre portion for connecting the optical fibre to a distributed temperature sensing system unit.

3. A sensing fibre according to claim 1, in which the optical fibre incorporates one or more further reflective elements, and a coiled fibre portion associated with each of the one or more further reflective elements and positioned adjacent its associated further reflective element on the side distal from the optical source.

4. A sensing fibre according to claim 1, in which the optical fibre incorporates a further coiled fibre portion associated with the or each reflective element and positioned adjacent its associated reflective element on the side proximal to the optical source, the further coiled fibre portion contributing substantially nothing to the spatial extent of the optical fibre when deployed.

5. A sensing fibre according to claim 1, in which the optical fibre is provided with a connector at its end on the side of the reflective element distal from the optical source for connecting the optical fibre to a distributed temperature sensing system unit.

6. A sensing fibre according to claim 1, in which the or each coiled fibre portion has a length in the range 1 m to 500 m.

7. A sensing fibre according to claim 1, in which the or each coiled fibre portion has a length in the range 1 m to 100 m.

8. A sensing fibre according to claim 1, in which the or each coiled fibre portion has a length in the range 1 to 50 m.

9. A sensing fibre according to claim 1, in which one or more of the or each reflective element comprises a join between two portions of optical fibre.

10. A sensing fibre according to claim 9, in which the join comprises abutted end facets of the two portions of optical fibre, each facet arranged at an acute angle to a longitudinal axis of the optical fibre to reduce back-reflection of incident light.

11. A sensing fibre according to claim 9, in which the join is implemented via an optical fibre connector.

12. A distributed temperature sensing system comprising:
    a sensing fibre according to any one of claim 1;
    an optical source operable to launch pulses of probe light into the proximal end of the sensing fibre; and
    a detector operable to detect light emitted from the proximal end of the sensing fibre arising from backscattering of the probe light within the sensing fibre, the detected light indicative of temperature along the spatial extent of the sensing fibre, and to generate an output signal representative of the detected light.

13. A distributed temperature sensing system according to claim 12, in which, in use, the detector becomes saturated by light reflected from the or each reflective element and has a recovery time after saturation, and the or each coiled fibre portion has a length not less than a distance the backscattered light can propagate in the sensing fibre during the recovery time.

14. A distributed temperature sensing system according to claim 12, and further comprising a processor operable to receive the output signal from the detector and to determine a profile of temperature along the spatial extent of the fibre from the output signal.

15. A distributed temperature sensing system according to claim 12, further comprising a processor operable to receive the output signal from the detector and to remove from the output signal a part or parts corresponding to detected light received from the or each coiled fibre portion.

16. A distributed temperature sensing system according to claim 15, in which the processor is further operable to determine a profile of temperature along the spatial extent of the fibre from the output signal.

17. A method of distributed temperature sensing comprising:
    deploying an optical fibre in a measurement region in a spatially extended deployment, the optical fibre incorporating a reflective element and a coiled fibre portion associated with the reflective element and positioned adjacent one side of the reflective element, the coiled fibre portion contributing substantially nothing to the spatial extent of the deployed optical fibre;
    launching a pulse of probe light into the end of the optical fibre on the side of the reflective element opposite the coiled fibre portion;
    detecting light emitted from the end of the optical fibre on the side of the reflective element opposite the coiled fibre portion arising from backscattering of the probe light within the optical fibre, the detected light indicative of temperature along the spatial extent of the optical fibre;

generating an output signal representative of the detected light;

removing from the output signal a part corresponding to detected light received from the coiled fibre portion; and determining a profile of temperature along the spatial extent of the fibre from the output signal.

18. A method of distributed temperature sensing according to claim 17, in which the detecting is performed using a detector that becomes saturated by light reflected from the reflective element and has a recovery time after saturation, and the coiled fibre portion has a length not less than a distance the backscattered light can propagate in the optical fibre during the recovery time.

19. A method according to claim 17, in which the optical fibre incorporates one or more further reflective elements and a coiled fibre portion associated with each of the one or more further reflective elements and positioned adjacent its associated further reflective element on the side distal from the end of the optical fibre into which the pulse of probe light is launched.

20. A method according to claim 17, in which the optical fibre incorporates a further coiled fibre portion associated with the or each reflective element and positioned adjacent the or its associated reflective element on the side opposite the coiled fibre portion, the further coiled fibre portion contributing substantially nothing to the spatial extent of the deployed optical fibre, the method further comprising:

launching a second pulse of probe light into the end of the optical fibre on the side of the or each reflective element opposite the further coiled fibre portion;

detecting light emitted from the end of the optical fibre on the side of the or each reflective element opposite the further coiled fibre portion arising from backscattering of the probe light within the optical fibre, the detected light indicative of temperature along the spatial extent of the optical fibre;

generating a second output signal representative of the detected light from the end of the optical fibre on the side of the or each reflective element opposite the further coiled fibre portion;

removing from the second output signal parts corresponding to detected light received from the coiled fibre portion and the further coiled fibre portion;

removing from the said output signal a part corresponding to detected light received from the further coiled portion; and determining a profile of temperature along the spatial extent of the fibre from the output signal and the second output signal.

21. A method according to claim 17, in which the or each coiled fibre portion has a length in the range 1 m to 500 m.

22. A method according to claim 17, in which the or each coiled fibre portion has a length in the range 1 m to 100 m.

23. A method according to claim 17, in which the or each coiled fibre portion has a length in the range 1 m to 50 m.

24. A method according to claim 17, in which one or more of the or each reflective elements comprises a join between two portions of optical fibre.

25. A method according to claim 24, in which the join comprises abutted end facets of the two portions of optical fibre, each facet arranged at an acute angle to a longitudinal axis of the optical fibre to reduce back-reflection of incident light.

26. A method according to claim 24, in which the join is implemented via an optical fibre connector.

* * * * *